United States Patent
Soon-Shiong et al.

(10) Patent No.: US 10,958,512 B2
(45) Date of Patent: Mar. 23, 2021

(54) FINE GRAINED NETWORK MANAGEMENT TO EDGE DEVICE FEATURES

(71) Applicant: Nant Holdings IP, LLC, Culver City, CA (US)

(72) Inventors: Patrick Soon-Shiong, Los Angeles, CA (US); John Wiacek, Los Angeles, CA (US)

(73) Assignee: Nant Holdings IP, LLC, Culver City, CA (US)

( * ) Notice: Subject to any disclaimer, the term of this patent is extended or adjusted under 35 U.S.C. 154(b) by 0 days.

(21) Appl. No.: 16/817,506

(22) Filed: Mar. 12, 2020

(65) Prior Publication Data

US 2020/0213190 A1 Jul. 2, 2020

Related U.S. Application Data

(63) Continuation of application No. 16/411,441, filed on May 14, 2019, now Pat. No. 10,594,549.

(60) Provisional application No. 62/673,641, filed on May 18, 2018.

(51) Int. Cl.
*G06F 15/173* (2006.01)
*H04L 12/24* (2006.01)
*G06N 20/00* (2019.01)
*H04Q 9/02* (2006.01)

(52) U.S. Cl.
CPC ........ *H04L 41/0803* (2013.01); *G06N 20/00* (2019.01); *H04L 41/22* (2013.01); *H04Q 9/02* (2013.01); *H04L 41/0213* (2013.01)

(58) Field of Classification Search
None
See application file for complete search history.

(56) References Cited

U.S. PATENT DOCUMENTS

| | | | |
|---|---|---|---|
| 7,522,036 B1 * | 4/2009 | Preuss | H05K 7/1457 307/150 |
| 7,552,111 B2 | 6/2009 | Motoyama et al. | |
| 8,504,740 B2 | 8/2013 | Brown et al. | |
| 8,683,591 B2 | 3/2014 | Wittenschlaeger | |
| 8,754,925 B2 | 6/2014 | Ng et al. | |
| 8,941,501 B1 | 1/2015 | Debijl | |
| 9,430,752 B2 | 8/2016 | Soon-Shiong | |
| 9,530,100 B2 | 12/2016 | Soon-Shiong | |
| 9,547,678 B2 | 1/2017 | Wnuk et al. | |

(Continued)

*Primary Examiner* — Phuoc H Nguyen
(74) *Attorney, Agent, or Firm* — Mauriel Kapouytian Woods LLP; Liang Huang; Andrew A. Noble

(57) ABSTRACT

Network management systems and methods are provided. A system is provided that includes an event database that provides a mapping of multimodal sensor data to events of devices coupled to a network, such as operational or behavioral events. A network management engine obtains a set of multimodal sensor data relating to a device, which may include sensor measurement or output data relating to each of multiple device operation or behavior parameters. The engine determines, utilizing the mapping, a match of the set of multimodal sensor data to a specific event associated with the device. Based at least in part on the determined match, the engine causes generation or updating of event data associated with the specific event, the data being accessible by network management software of the network management system.

26 Claims, 10 Drawing Sheets

(56) References Cited

U.S. PATENT DOCUMENTS

| | | |
|---|---|---|
| 9,560,094 B2 | 1/2017 | Pal et al. |
| 9,640,845 B2 | 5/2017 | Kururna et al. |
| 9,907,503 B2 | 3/2018 | Konno |
| 9,919,646 B1 | 3/2018 | Arnold et al. |
| 9,922,270 B2 | 3/2018 | Song et al. |
| 9,929,772 B2 | 3/2018 | Rose et al. |
| 10,192,173 B2 | 1/2019 | Stephens et al. |
| 10,594,549 B2 | 3/2020 | Soon-Shiong et al. |
| 2009/0234512 A1* | 9/2009 | Ewing ............... H04L 12/10 700/295 |
| 2011/0145657 A1* | 6/2011 | Bishop ............ G06F 11/3495 714/47.1 |
| 2012/0015657 A1* | 1/2012 | Comsa .............. H04W 72/04 455/436 |
| 2012/0054397 A1* | 3/2012 | Melvin, Jr. ...... H02J 13/00024 710/300 |
| 2016/0232116 A1* | 8/2016 | Bone ................ H04W 80/06 |
| 2017/0220956 A1* | 8/2017 | Stephens ............ A63F 13/67 |
| 2018/0115958 A1* | 4/2018 | Raghavan ........... H04W 4/50 |
| 2018/0157255 A1* | 6/2018 | Halverson .......... B64C 39/024 |
| 2019/0349190 A1* | 11/2019 | Smith ................ H04L 69/18 |

* cited by examiner

FINE GRAINED NETWORK MANAGEMENT TO EDGE DEVICE FEATURES

This application is a continuation of U.S. non-provisional application having Ser. No. 16/411,441 filed May 14, 2019, which claims the benefit of priority to U.S. provisional application having Ser. No. 62/673,641 filed May 18, 2018. These and all other extrinsic materials discussed herein are incorporated by reference in their entirety.

BACKGROUND

This disclosure relates generally to network management and management of devices over a network. More than ever, a variety of devices in any number of disparate applications and uses, from components of cars to medical monitoring equipment, are coupled to, and exchange information over, networks. Such devices may include instrumentation allowing, for example, collection and communication, through the network, of information related to operation of the device or its components. Furthermore, remote communication to the device, or between devices, may also be utilized, for example, in providing updates, remote monitoring or control, coordination, or for many other reasons and uses.

For example, in what has come to be termed the "Internet of Things", devices such as vehicles, appliances, and any number of other types of items, may be instrumented with sensors, electronics, software, interfaces, etc., allowing collection and exchange of data over the Internet and other networks.

There are known technologies, in various fields, that include collection of data, including sensor data, for use in identifying and alerting or responding to conditions relating to devices or other entities.

Some technologies attempt to address problems related to location and activity identification. For example, U.S. Pat. No. 9,560,094, entitled, "System and method for identifying and analyzing personal context of a user" includes the use of various types of sensor data to deduce, with certain degrees of confidence, context information about a user, such as location, identity and activity. The sensor data can include data from external sensors as well as data from sensors embedded in a mobile communication device.

Other technologies attempt to address audio or visual problems, such as constructing or directing views, etc. For example, U.S. Pat. No. 8,754,925, entitled, "Audio source locator and tracker, a method of directing a camera to view an audio source and a video conferencing terminal" uses data from at least two different types of sensors to locate an audio source, such as in a video conferencing context.

Other technologies are generally related to batteries, such as technologies directed to conserving or improving battery life. For example, U.S. Pat. No. 9,929,772, entitled, "Low power, high resolution automated meter reading and analytics", is directed to problems including improving battery life performance in end devices in resource monitoring systems, including sensor interfaces in end devices configured to communicate with multiple types of sensors. Such sensors can include 3-wire Automatic Meter Reading (AMR) sensors, Hall effect sensors, reed switch sensors, pulses sensors, and magneto-resistive sensors. Generally, different duty cycles may be utilized in the end devices, relating to power usage associated with sensor data collection and usage, to conserve battery life associated with the end device.

Sensor technologies have been developed that are directed to car batteries, in particular. For example, U.S. Pat. No. 9,640,845, entitled, "Temperature-raising device and temperature-raising method for in-car battery", discusses use of a temperature sensor installed around an in-car battery, to obtain car battery temperature data in connection with use of a car battery heater system.

Various sensor and alert technologies exist in the context of vehicles. For example, in U.S. Pat. No. 9,919,646, entitled, "Sound, temperature and motion alarm for vehicle occupants and pets", various types of detectors and sensors are used in connection with a vehicle temperature alarm system. In general, when certain detectors or sensors pick up certain conditions, other detectors may be turned on as a result. This can ultimately lead to a motion detector being turned on, which may sound an alarm upon sensing of motion. Other sensor technologies are specifically associated with detecting drunk driving. For example, U.S. Pat. No. 8,941,501 is directed to a system that includes preventing start of the vehicle if an alcohol sensor detects a high enough alcohol content by volume in the breath of the would-be driver.

Sensor system technologies also exist for use in medical monitoring. For example, U.S. Pat. No. 9,907,503, entitled, "Sensor systems and methods of using the same", is directed to utilization of a selectively positionable sensor system, to sense one or more analytes in a bodily fluid, for use in controlling fluid administration to a patient.

SUMMARY

The above-referenced known technologies generally have limitations in areas including, for example, practical utility, overall sophistication and granularity, and overall accuracy and precision including with respect to determination of thresholds or conditions, and many of these technologies have not been adapted to use, or at least in some cases not adapted to fully leverage, the advantages of network connectivity. There are potential benefits that have not yet been realized in scenarios and applications including exchange of device related information over a network, such as, for example, "Internet of Things" applications. Many unrealized benefits can be realized to the extent that more useful, accurate, or very granular device-related information can be efficiently collected from devices and that information can be effectively put to use in managing edge devices. Such benefits include those in areas such as device operation, efficiency, monitoring, alerting, visibility, control, automation, optimization, determination or recognition of events, and others.

In some embodiments of the invention, a device is instrumented, which can include equipped with or coupled to sensors, hardware, software, interfaces, etc., to collect multimodal sensor data (i.e., one or more data types representing one or more sensor modalities), such as may relate to multiple operational parameters of the device or a component of the device, and to communicate the data over a network. The data may, for example, relate to multiple operational parameters of a device, device set or group, or a component of a larger device or item, such as a battery of a vehicle or device. The data may be transmitted, including wirelessly, over the Internet and other networks. In some cases, the data may be processed or filtered at the device or otherwise prior to being transmitted over the network, where it may be further processed remotely, etc.

In some embodiments, remotely from the device, an event database is maintained. The event database may associate, or map, sets of multimodal sensor data to associated events (which can include, among other things, occurrence or continued occurrence of particular statuses, states, conditions, etc.), such as operational or behavioral events related to the device. In some embodiments, behavioral events can relate to behavior of people or animals as sensed or otherwise digitally observed. In some such cases, the device or devices involved may gather data relating to the person, for example, and an event associated with the device could mean, for instance, a behavioral event associated with the person whose data is being collected by the device. In some embodiments, the event database, which may be structured as a Management Information Base (MIB), for example, may effectively reflect or model, structurally, organizationally, verbally, hierarchically or ontologically, aspects of a subject, such as operational aspects of a device, component set, or component, or even of a larger structural entity such as a roadway or building, or behavioral aspects of a person or an animal, group, environment, ecosystem, etc.

In some embodiments, mapping includes ranges or thresholds for each of multiple sensed parameters, such as measurement data or sensor output data, which ranges or thresholds must be met in order for a match to be determined. In some embodiments, more complex mapping techniques or models may be used, such as may use functions, variables, graphing techniques, vector modelling, or other techniques.

In some embodiments, remotely from the device, a network management engine, coupled to the event database, such as may be implemented using one or more servers, obtains the set of multimodal sensor data. The network management engine may further match the set of multimodal sensor data to a particular event associated with a device or other entity (e.g., person, animal, environment, etc.), which event may be determined or deemed to have occurred or be occurring, or to be likely to have occurred or be occurring (e.g., a vehicle battery overheating, or some other component experiencing some condition).

In some embodiments, based at least in part on the determined match to the particular event associated with the device, the network management engine generates or updates event data associated with the event, which event data is accessible by network management software.

In some embodiments, after the event data is detected, actions may be taken, such as determining, and communicating over a network, system or user alerting, device operation modification or optimization instructions or commands, etc.

In some embodiments, events may relate to human or animal behavioral events as determined from multimodal sensor data. For example, in a health care or medical context, monitored patient medical parameter information can be used to assess or determine a patient-related health event, or, in a consumer related context, shoplifting or fraud may be determined, etc. Many other applications and contexts are possible.

In some embodiments, existing network infrastructure, protocol, standards, etc., may be leveraged in data collection, processing and communication. Furthermore, machine learning techniques may be utilized to repeatedly or iteratively modify and optimize the mapping of the event database. Sensed parameter data and related results data, as well as mapping and other data, may be used as training data for the machine learning techniques or models.

Generally, techniques according to embodiments of the invention can provide advantages in many ways and in disparate applications in network management, and management of devices or entities coupled to or associated with a network.

Various other aspects of the inventive subject matter will become more apparent from the following specification, along with the accompanying drawings in which like numerals represent like components.

While the invention is described with reference to the above drawings, the drawings are intended to be illustrative, and other embodiments are consistent with the spirit, and within the scope, of the invention.

DETAILED DESCRIPTION

Herein, "sensor data" can broadly include, for example, output or measurement data from sensors, or data derived therefrom or based thereon, such as after being processed, filtered or modified. Typically sensor data is in a digital format or converted to a digital format understandable by a computer. For example, an analog device (e.g., thermostat, etc.) could generate an analog signal that is converted to a digital value via an analog to digital converter (ADC). Further, the raw digital value can be further converted or formatted for consumption by humans or computers; converted to XML or JSON format for example.

Herein, "behavior" and "behavioral" can broadly include, for example, the manner of function, operation or conduct, of an entity; a device, people, person, animals, groups, or other entity capable of responding to stimuli.

Herein, "device" can broadly include one or more aspects, components or elements of a device; typically a computing device having at least one non-transitory computer readable memory (e.g., RAM, flash, HDD, SSD, etc.) and at least one processor.

Herein, a set of "multimodal sensor data" can broadly include, for example, a set of data that includes sensor data relating to each of multiple parameters including, in some cases, data sensed using different modalities.

Herein, an "edge device" can broadly include, for example, a device at the conceptual "edge" of a network, such as end devices or user devices, among other things, including devices in Internet of Things environments, for example. Furthermore, an "edge device" can include, for example, a device which provides an entry point into a network, such as routers, routing switches, integrated access devices (IADs), multiplexers, metropolitan area network (MAN) and wide area network (WAN) access devices, and others.

Herein, an "event" can broadly include, for example, particular occurrences, happenings, occurrences, activities, or actions, which can include occurrence or continued occurrence of particular statuses, states, conditions, etc., and can also include network, software or computer-related events, etc.

Figure 1:
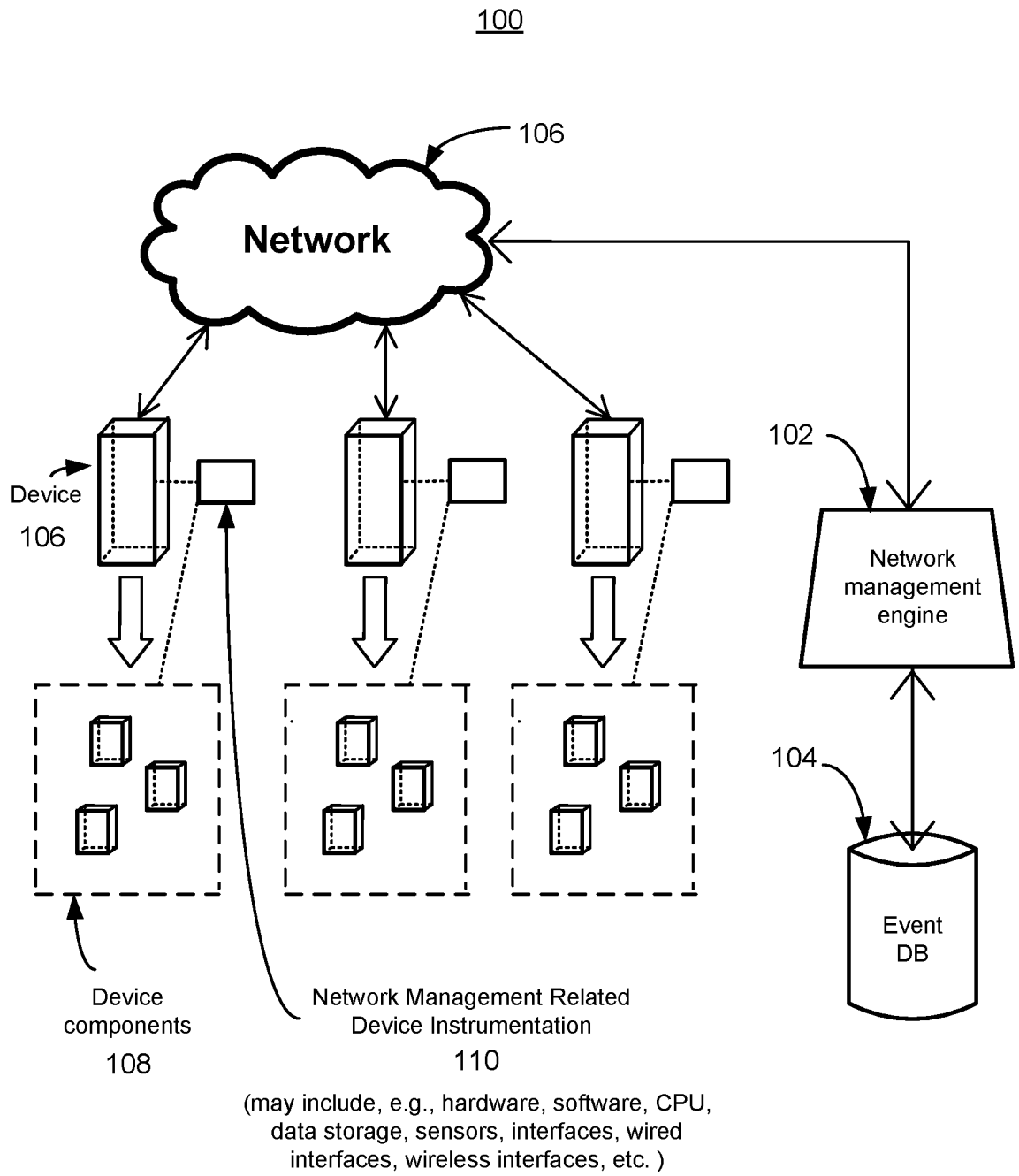
FIG. 1 illustrates a networked system in accordance with an embodiment of the invention, including a network management engine, event database and devices.

FIG. 1 illustrates a networked system 100 in accordance with an embodiment of the invention. A number of devices 106 and network management engine 102 are coupled to a network 106. The network management engine 102 is coupled to event database 104. Each of the devices 106 includes multiple components 108, and each includes or is coupled to network management related device instrumentation 110, which may broadly include, for example, hardware, software, applications, CPUs, data storage, sensors, interfaces, wired interfaces, wireless interfaces, or other elements.

Figure 2:
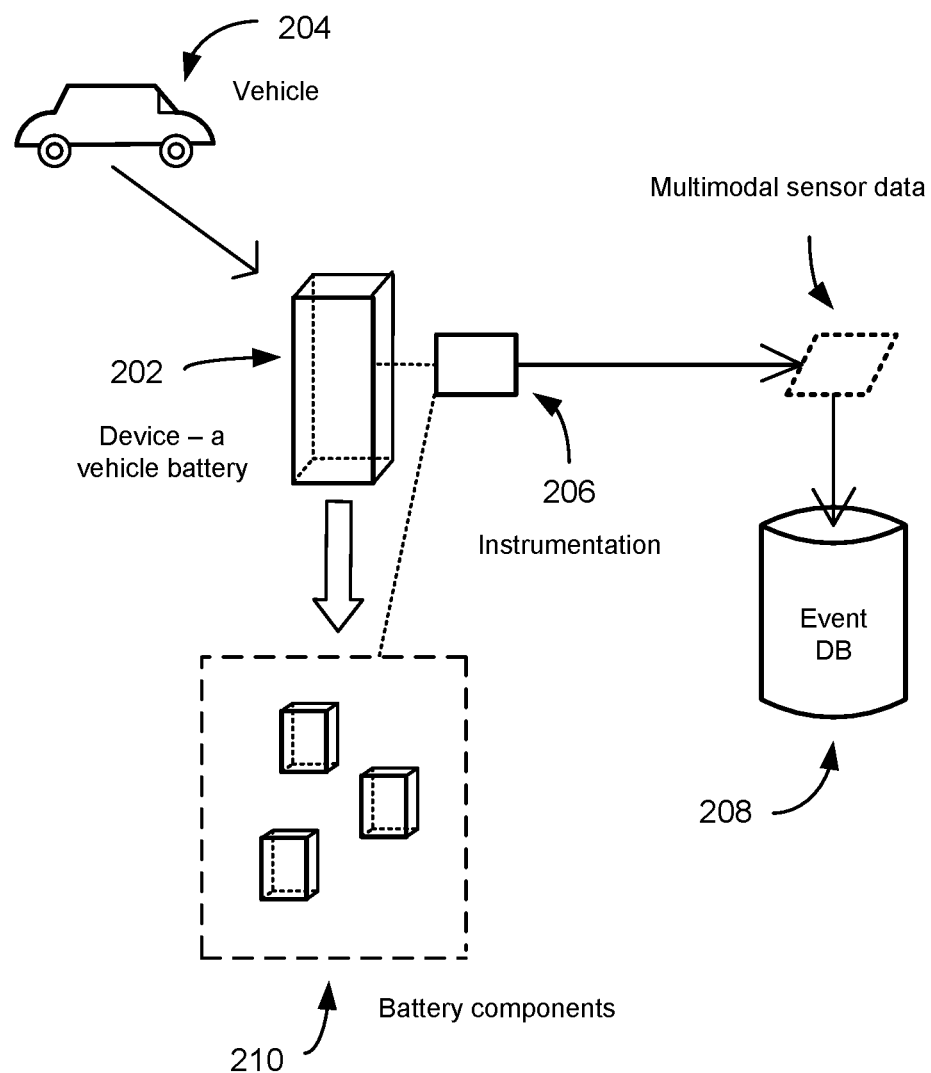
FIG. 2 illustrates a block diagram in accordance with an embodiment of the invention, including collection and storage multimodal sensor data relating to a vehicle battery.

FIG. 2 illustrates a block diagram 200 in accordance with an embodiment of the invention, including collection and storage multimodal sensor data relating to a device, specifically, a battery 202 of a vehicle 204. In example scenario illustrated, battery 202, which includes various battery components 210, includes or is coupled to instrumentation 206 for uses that may include collecting, processing, filtering and sending multimodal sensor data for storage in an event database 208.

Figure 3:
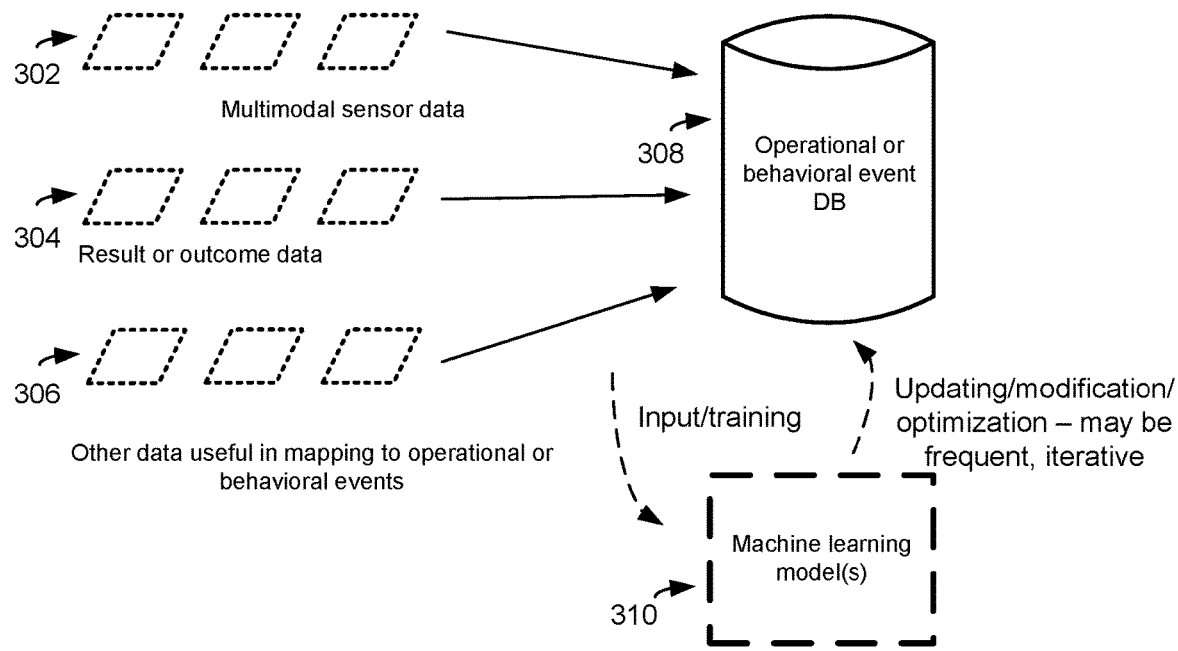
FIG. 3 illustrates a block diagram in accordance with an embodiment of the invention, illustrating event database mapping and use of event data.
Figure 3:
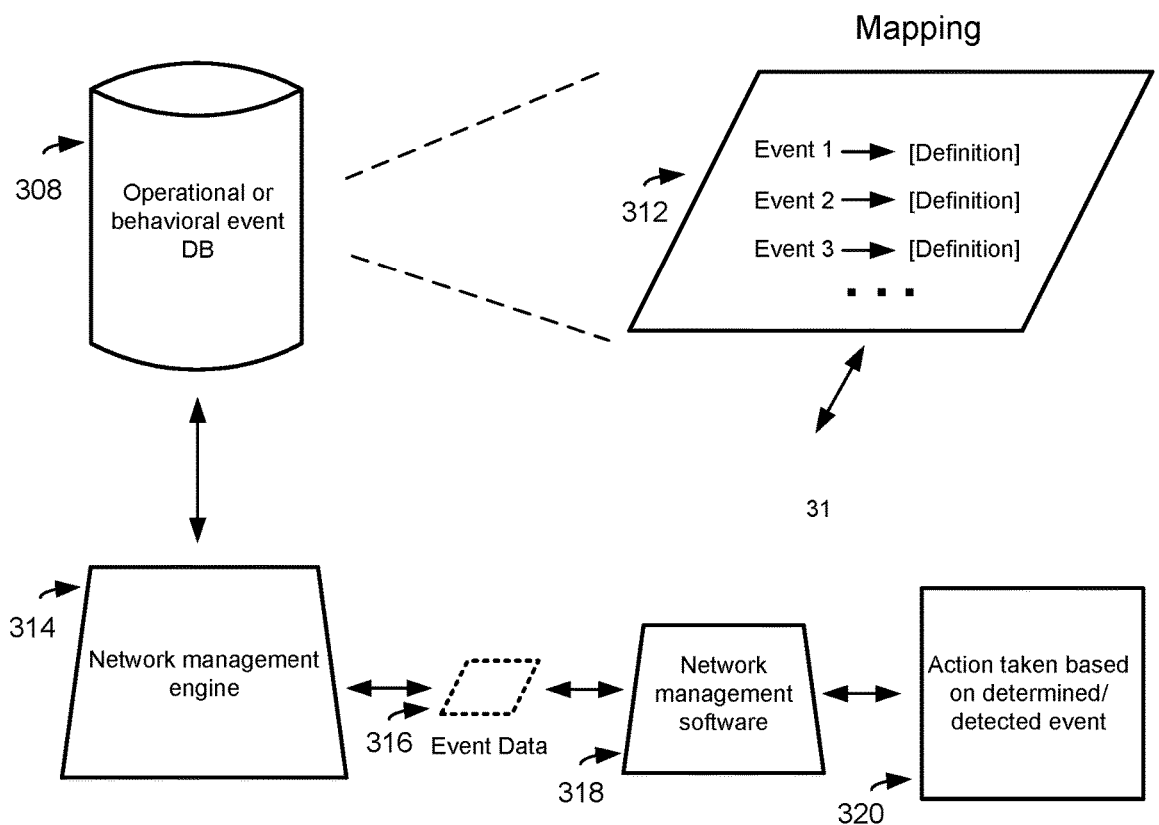

FIG. 3 illustrates a block diagram 300 in accordance with an embodiment of the invention, illustrating event database mapping and use of event data. As depicted, many data sets of several different types of data sets 302, 304, 306 may be sent to, and stored in, operational or behavioral event database 308. The data can include multimodal sensor data 302, which can include, for example, data derived from sensor data, including after being processed, filtered or modified. The data can further include result or outcome data 304, which can, for example, relate to results or outcomes of determined events associated with multimodal sensor data, or results or outcomes of actions taken based on such events, or based on detected event data that was generated or updated based on such events. The data can further include other data useful in mapping to operational or behavioral events, which can include, for example, being useful in recognizing events, defining events or criteria, identifying events, defining, updating or modifying mapping, etc.

One or more machine learning models 310 may be used in connection with the database 308, such as to update, modify or better optimize the database 308, which may be done iteratively and frequently. Various data may be used as input or training data to train, optimize or modify the machine learning model(s) themselves. For example, any of data 302, 304 and 306 may be so used, or other data, such as from the database 308, including mapping related data. As illustrated, mapping 312 of the database 308 can include, for example, a set of specific definitions or required criteria of specific events, such as operational or behavioral events. For example, definitions can be or include specifications or requirements in terms of multimodal sensor data, thresholds (which may relate to each of multiple parameters, measurements, or outputs, for example), ranges or limits, criteria relating to other data such as result or outcome data, or complex definitions, such as multivariable functions or equations that may include multimodal sensor data within the functions, such as by being variables within the functions.

As illustrated, network management engine 314 may generate or update event data 316, such as when it is determined that a set of multimodal sensor data matches the definition of specified event, which may indicate that the event is determined or deemed to have occurred or to be occurring. Furthermore, as illustrated, network management software 318 (which, in various embodiments, may or may not be part of the network management engine 314 itself) may, for example, detect, or monitor for and detect, event data 316, and may cause, facilitate or help facilitate the taking of some action 320 based at least in part on the detected event data 316, such as, for example, an operational or behavioral modification or optimization, or issuing of instructions or commands therefor, or alerting, whether, for example, intra-system or alerting or alerting for display to and use of a user, etc.

Figure 4:
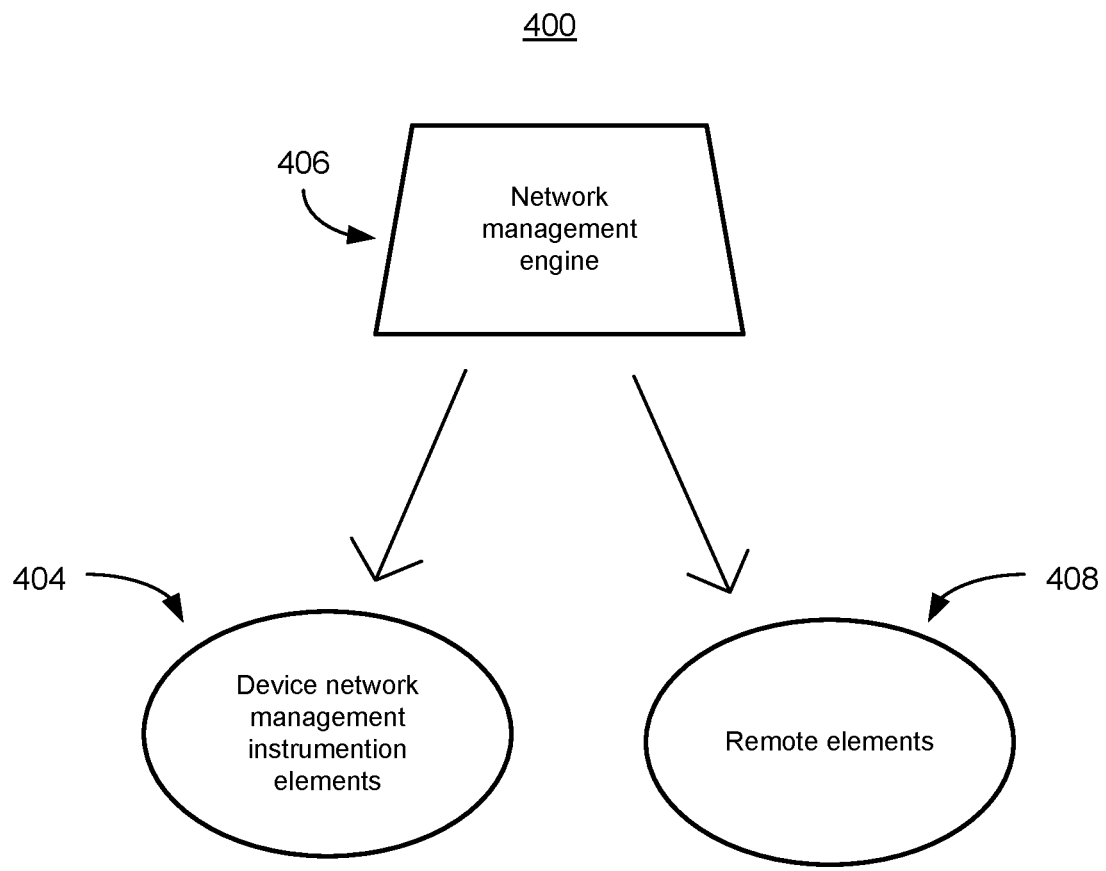
FIG. 4 illustrates a block diagram in accordance with an embodiment of the invention, illustrating components of a network management engine.

FIG. 4 illustrates a block diagram 400 in accordance with an embodiment of the invention, illustrating components of a network management engine 406, which includes device network management instrumentation elements 404 and remote elements 408. Device network management instrumentation elements 404 may, for example, relate to collection, local storage, management, filtering and processing of multimodal sensor data prior to wireless transmission to remote elements of the network management engine or other devices. Remote elements 408 may, for example, be implemented by one or more servers after multimodal sensor data (which may be filtered or processed data) is received after being wirelessly transmitted from the device.

Figure 5:
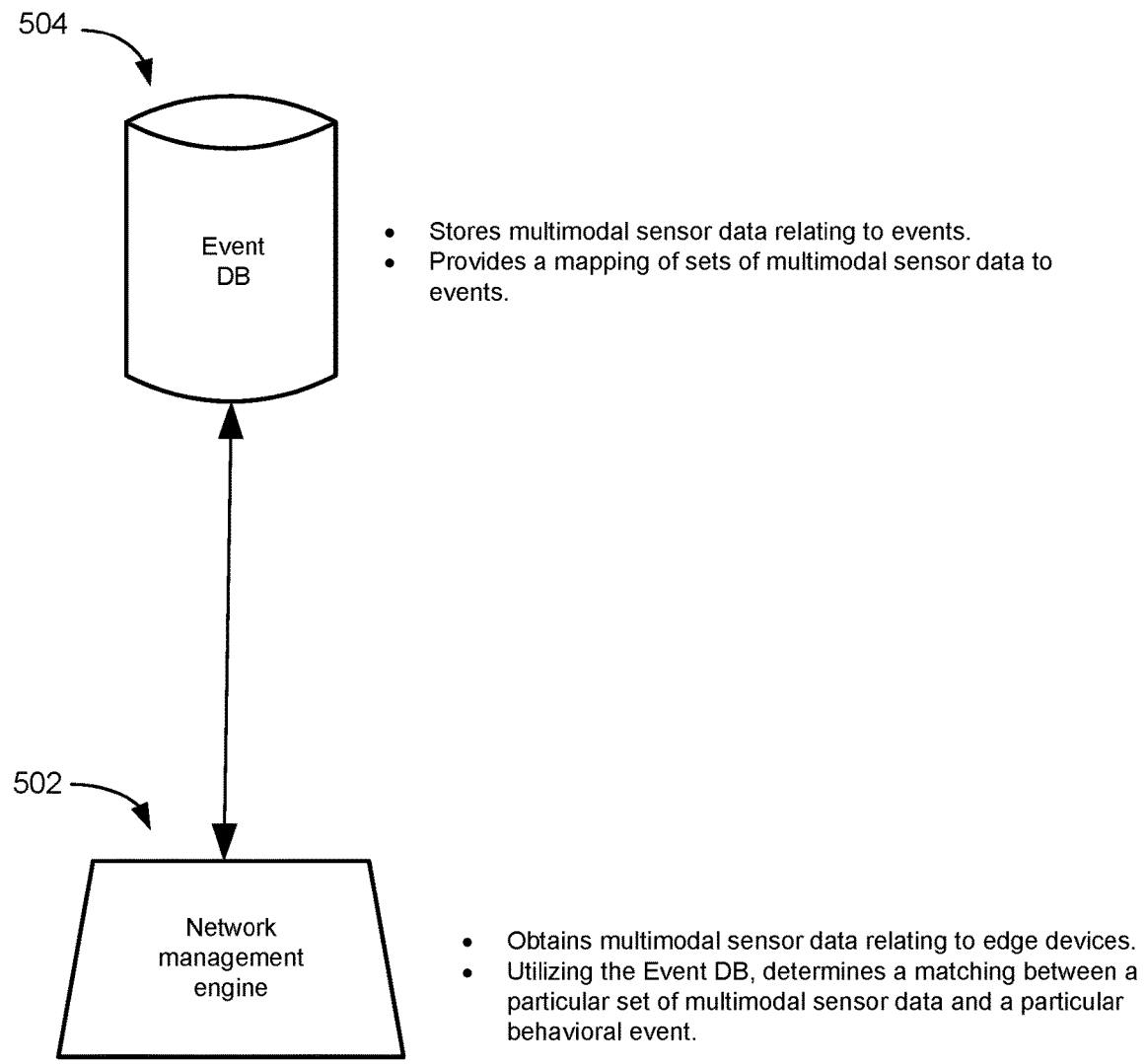
FIG. 5 illustrates a block diagram in accordance with an embodiment of the invention, illustrating roles of a network management engine and an event database.

FIG. 5 illustrates a block diagram 500 in accordance with an embodiment of the invention, illustrating roles of a network management engine 502 and an event database 504.

In some embodiments, the event database 504 stores multimodal sensor data relating to events, such as operational or behavioral events, relating to edge devices, such as batteries, vehicle batteries or other components, manufacturing devices, medical/medical monitoring related devices, consumer/consumer behavior monitoring related devices, etc. It may also store logs of such data, or such data over time, such as by using blockchains or other distributed ledger or data structures. It may further store additional data such as outcome data relating to results or outcomes associated with behavioral events. Furthermore, it may provide a mapping of sets of multimodal sensor data to events, such as may relate, for example, to device operation or device component operation or status conditions. In some cases, multiple parameter measurements may be included in a mapping to a particular behavioral or operational event. For example, in some cases, each of multiple parameter measurements must fall within particular ranges or meet particular thresholds, or satisfy more complex criteria that may include one or more functions, for example, in order for a particular event to be reflected by the mapping. In some embodiments, the Event databases can be or include elements of a MIB, and may use such protocols or standards as Simple Network Management Protocol (SNMP) and OpenNMS (see URL www.opennms.com). It may also be structured hierarchically and ontologically in connection with categories and terms relating to the behaviors.

In some embodiments, the network management engine 502 obtains multimodal sensor data relating to edge devices. Furthermore, it may, utilizing the event database 504, determine a matching between a particular set of multimodal sensor data and a particular behavioral event, which may indicate that the behavioral event has occurred or is continuing to occur. The network management engine 502 may also generate or update event data associated with the event, which may be accessed by network management software. In some embodiments, it may monitor for and detect generated or updated event data. Furthermore, it may cause actions to be taken upon such detection, such as generation or display of alerts, or causing modification of operation of the relevant device or component, such as to optimize operation thereof. Still further, it may utilize one or more machine learning techniques or models in connection with the event database 504, such as to detect event and outcome patterns, or to modify or optimize mapping relating to multimodal sensor data and events.

Figure 6:
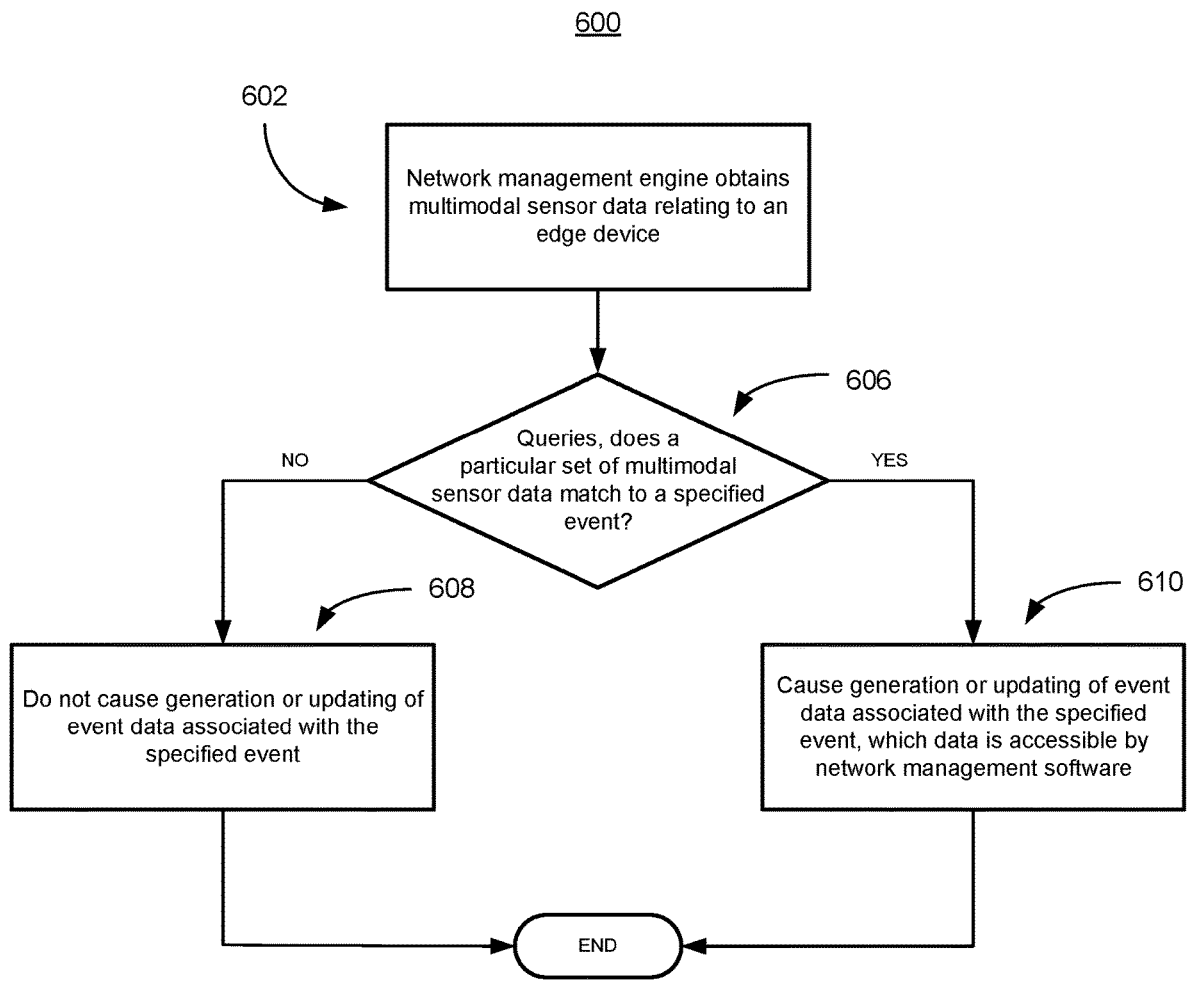
FIG. 6 illustrates a flow diagram of a method in accordance with an embodiment of the invention, including generation or updating of event data upon a determined match.

FIG. 6 illustrates a flow diagram of a method 600 in accordance with an embodiment of the invention, including generation or updating of event data upon a determined match. At step 602, a network management engine obtains multimodal sensor data relating to an edge device.

At step 606, the network management engine queries whether a particular set of multimodal sensor data matches to a specified event. If no match is determined, then, at step 608, no event data is generated or updated. However, if a match is determined, then, at step 610, the network management engine causes generation or updating of event data associated with the specified event, which data is accessible by network management software.

Figure 7:
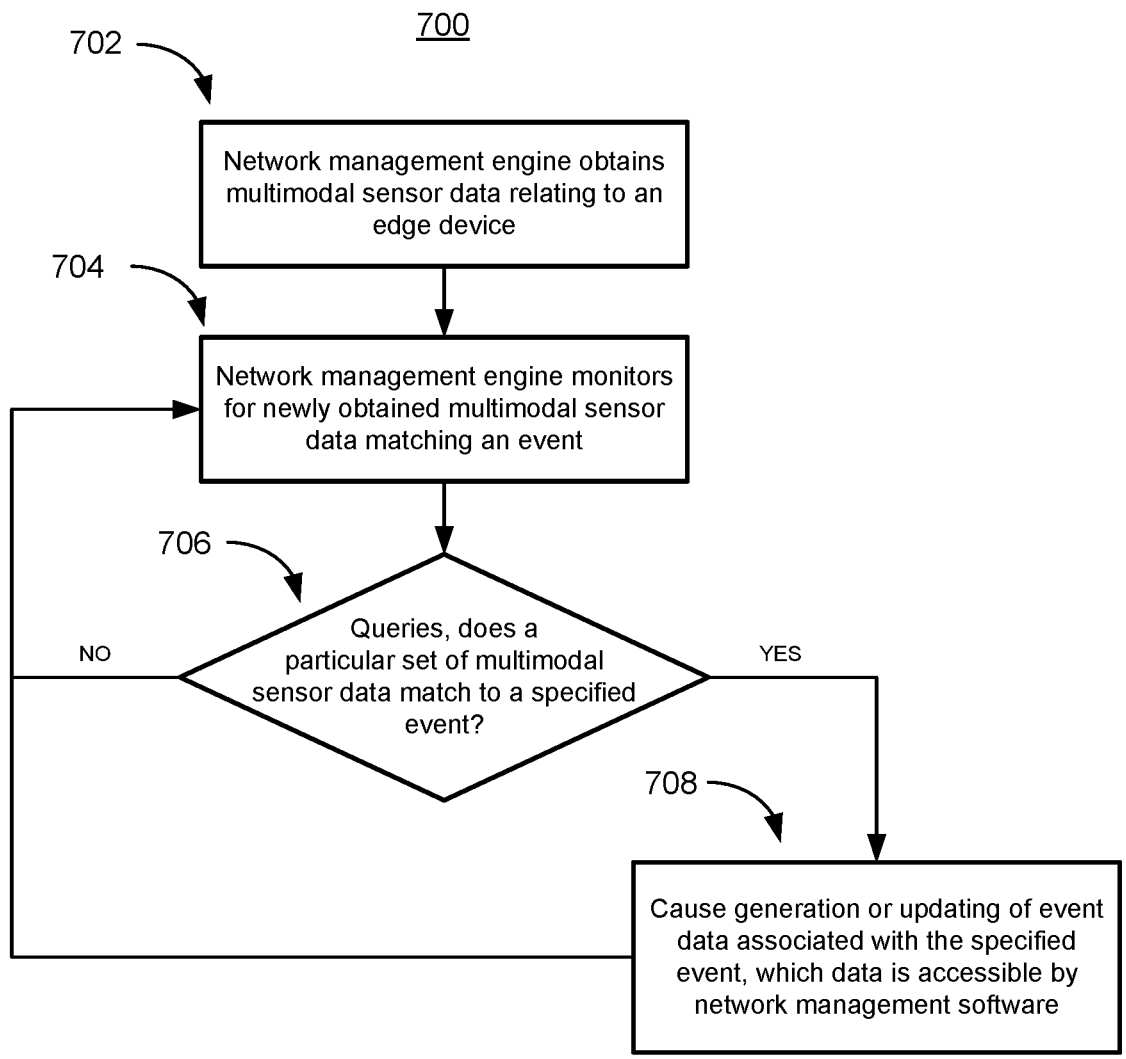
FIG. 7 illustrates a flow diagram of a method in accordance with an embodiment of the invention, including monitoring for new multimodal sensor data.

FIG. 7 illustrates a flow diagram of a method 700 in accordance with an embodiment of the invention, including monitoring for new multimodal sensor data. At step 702, a network management engine obtains multimodal sensor data relating to an edge device. At step 704, the network management engine monitors for newly obtained multimodal sensor data matching an event.

At step 706, the network management engine then queries whether a particular set of multimodal sensor data matches to a specified event. If no match is detected, the method 700 proceeds back to step 704, at which the network management engine again monitors, or continues to monitor, for newly obtained multimodal sensor information. However, if a match is detected, the method proceeds to step 708, at which the network management engine causes generation or updating of event data associated with the event, which data is accessible by network management software.

Figure 8:
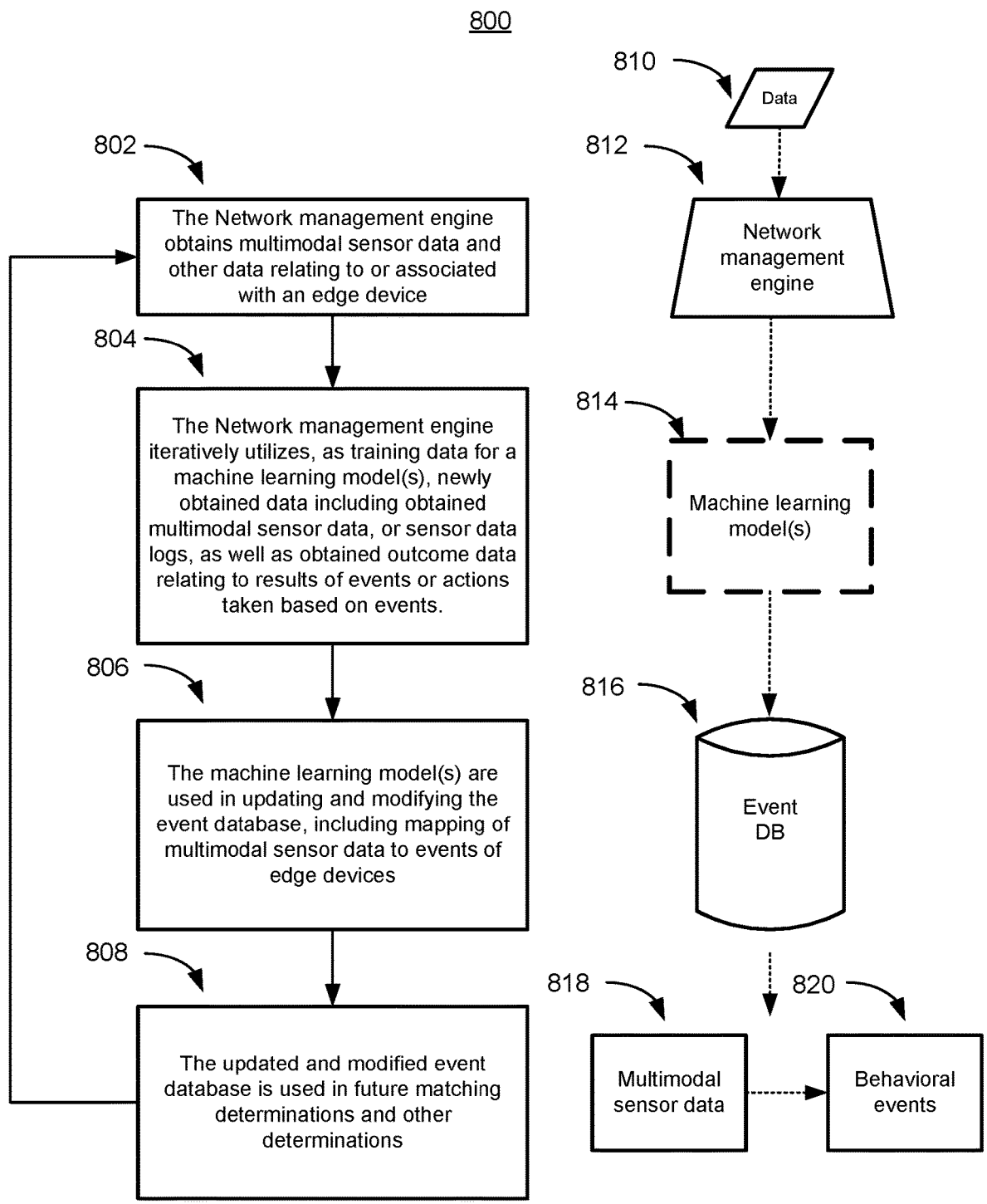
FIG. 8 illustrates a flow diagram of a method in accordance with an embodiment of the invention, including utilizing machine learning to update an event database.

FIG. 8 illustrates a flow diagram of a method 800 in accordance with an embodiment of the invention, including utilizing machine learning to update an event database 816. At step 802, a network management engine 812 obtains multimodal sensor data or other data 810 associated with an edge device.

At step 804, the Network management engine iteratively utilizes, as training data for a machine learning model(s) 814, newly obtained data including obtained multimodal sensor data, or sensor data logs, as well as obtained outcome data relating to results of events or actions taken based on events.

At step 806, the machine learning model(s) 814 are used in updating and modifying event database 816, including mapping of multimodal sensor data to events associated with edge devices.

At step 808, the updated and modified event database 816 is used in future matching determinations of sets of multimodal sensor data to behavioral events, and may be used in other ways as well. Thereafter, the method 800 returns to step 802, where the network management engine 812 obtains new multimodal sensor data and other data relating to, or associated with, an edge device.

In some embodiments of the invention, existing network management tools, structures, protocols, standards, etc. are used in creative ways. For example, such tools may be used to characterize, at increasingly fine levels of detail or granularity, the workings of devices, such as edge devices in Internet of Things scenarios, as well as sets of components, individual components, etc. Devices can be instrumented to allow, among other things, this collection and organization of useful data. For example, in some embodiments, the OpenNMS network monitoring and network management platform may be used in obtaining such fine-grained device operational data. Furthermore, databases according to some embodiments may utilize or be a MIB, and utilize protocols associated with such databases. This particularly may include SNMP. MIB and SNMP can be used to effectively manage and organize data about edge devices as well interfacing devices. MIB and SNMP can also be used effectively in embodiments of the invention to structure, organize and utilize device related data in modifying device operation or behavior, such as upon detection of operational or behavioral events based on multimodal sensor data, for instance.

Furthermore, in some embodiments, a MIB and mapping utilized can be structured hierarchically and ontologically, such as a MIB of behavioral or operational events, or events in particular contexts, etc. This could include, in effect, a MIB of any number of devices in automotive, manufacturing or other industries, such as, for example, zinc-air battery operation, including a hierarchy that may reflect larger and more fine-grained components and subcomponents, and relationships between them, etc. Another very different example could be a MIB of, for example, consumer behavior, which could higher and more fine-grained actions or conduct, such as actions relating to lead-up to purchasing and actual purchasing, etc. Other examples could include MIBs of smaller components, or even MIBs are larger scale structures, like an entire vehicle or roadway, etc. In some embodiments, MIBs, as event databases, could even be used to reflect aspects of entities or individuals themselves, such as patients, or even groups, social networks, organizations, infrastructures. For example, in some embodiments, a MIB, or associated mapping can be organized such that data associated with multiple parameters may be utilized to determine whether specified, context-specific events have occurred or are occurring.

For example, with a battery, such as a lithium ion battery, zinc-air battery, etc., multiple technical battery parameters or attributes may be represented in the MIB and associated with a definition of an event, such as overheated status or lower power status occurring. Furthermore, for example, battery or power management device components could be subject to instrumentation and drill-down on a fine-grain and multicomponent basis. The cumulative, structured data can be reflected in the structure of the MIB and mapping to particular operational events.

Some embodiments of the invention can be utilized in connection with vehicle batteries, such as car batteries (even potentially including, for example, now or in the future, metal-air or zinc-air batteries or other energy storage devices). In some embodiments, multimodal sensor data can be collected and utilized in connection with car batteries, and components thereof. Car battery sensors and interfaces may be provided, integrated or incorporated into the battery, mounted or installed to measure parameters relating to the battery or particular components or subcomponents thereof. Such parameters that may be sensed, or may be directed indirectly detected, calculated or deduced from sensed data, may include, for example, operating temperature, temperature gradients or differences, voltage, nominal cell voltage, current, charge, discharge, transient response, internal resistance, internal resistance cathode area, air availability, air distribution, oxygen, porosity, catalytic value of the cathode surface, capacity, power, specific power, energy, age, or other electrical, chemical or mechanical parameters. The multimodal sensor data can then be used to determine whether operational events, such as overheating or low power, for example, or conditions or thresholds related to particular parameters, have occurred. In some embodiments, sensors and interfaces may be incorporated into a module that can be mounted onto the battery.

Battery-related operational events may be determined based on event definitions or thresholds stored in an event database, utilizing multimodal sensor data, and potentially other data, such as data from control units within the car electrical system. Based on determined event data, various actions may be initiated or taken, such as alerting or car or battery operational commands or actions, such as may involve various aspects of battery operation, including cycling, charging, or heating of the battery.

The following provides an example of one embodiment of the invention, in connection with a zinc-air battery. These batteries are generally considered safer than various other types of batteries. Moreover, since zinc-air batteries use atmospheric oxygen as a cathode reactant, as opposed to using a cell-contained chemical reactant, a zinc-air battery cell can provide a very high energy density, thus allowing the zinc-air battery to be lightweight, compact and high capacity. These characteristics have led to increasing use of zinc air batteries in applications including, for example, providing power to electronic and telecommunications devices, medical monitoring devices, and even electric vehicles.

Performance of zinc-air batteries is affected by factors, or parameters, notably including temperature, ambient relative humidity, discharge rate, and the percentage of capacity remaining in the battery cell. Moreover, performance is affected by a complex interplay between these factors.

In particular, voltage provided by a zinc-air battery is affected by each of these parameters, and their combinations. For example, a zinc-air battery may typically operate well at a temperature of 0-50° C., and an ambient relative humidity of between 40-60%, but performance will also be influenced by parameters including discharge rate and percentage of capacity remaining in the battery cell. Maintaining an optimal (or sufficient) provided voltage output, or voltage output range, may depend not only on each of these parameters being within certain ranges, but also on their values or value ranges relative to each other. As such, values for a particular parameter, such as temperature, that threaten optimal voltage output can vary depending on the values of the other parameters. As one specific example of this, while lower temperature generally leads to lower voltage output, so does lower remaining capacity. So, for example, in a hypothetical case, keeping other parameters constant, at 100% remaining capacity, a temperature of 10° C. or lower may cause voltage to drop below the optimal value or range, whereas, at 25% remaining capacity, a temperature of 5° C. or lower may be required to cause voltage to drop below the optimal value or range.

In spite of this complex interplay between the four mentioned parameters as affecting output voltage of a zinc-air battery cell, the relationships of them at various value ranges can be experimentally determined, for a particular type of zinc-air battery cell. This, in turn, can be used, for example, to determine combinations of value ranges for each of the four parameters that are considered to place a defined optimal (or sufficient) voltage output in jeopardy. As such, for example, even if voltage can be sensed or measured directly, and falls within the optimal range, it may be noteworthy and useful to detect when combinations of the four previously mentioned parameters place optimal voltage output in jeopardy, such that if one or several of them vary even slightly (such as by a certain small percentage) in a particular direction (such as, for example, a 1° C. temperature drop), optimal voltage output may fail. What combinations of the parameters suffice to constitute "jeopardy" in this regard can defined, for example, based on one or several of the parameters being extremely close, such as within a small, defined percentage, of that which would, in combination with a particular set of other parameter values, lead to output voltage dropping below the optimal (or sufficient) value or range.

Given all of the above, for a particular zinc-air battery, in one embodiment of the invention, the zinc air battery may be instrumented with, or to include, sensors to allow frequent or constant multimodal sensor data collection and measurement of each of these parameters over time. An optimal (or sufficient) "output voltage jeopardy" operational or behavioral event may be defined to include various combinations of sets of value ranges for each of the four parameters (it is noted that, in other embodiments, other or different parameters, potentially directly including voltage, could also be included or accounted for). It is notable that, at a given time, even if voltage is within the optimal range, an output voltage jeopardy event may still occur. Moreover, given the interplay between the parameters, even if none of the individual parameters alone would indicate jeopardy, the combination of them might still come sufficiently close to causing output voltage to drop below the optimal range, and thus might still trigger an output voltage jeopardy event. As such, this demonstrates an example of how some embodiments of the invention allow, among other things, recognition of significant events that might otherwise go unrecognized or undetected.

Continuing with description of the above example, a MIB could be designed to include definitions and mapping of various operational and/or behavioral events relating to the particular type of zinc-air battery. Operation or behavior of the battery cell can be monitored. When combinations of values of particular parameters, as measured using multimodal sensor data, fall within certain defined ranges, they can be matched to a defined event, such as, in the above-described example, an optimal (or sufficient) output voltage jeopardy event. Based on this determined match, event data can be generated or updated. This can include, for example, utilizing an OpenNMS platform in receiving or detecting event data, generating notifications or alarms, issuing commands, etc. Continuing with the above example, once an optimal (or sufficient) output voltage jeopardy event is detected, notifications can provided, steps taken, or operational commands issued, to prevent the parameters from further changing such as to cause voltage to drop below the optimal (or sufficient) range (or value). There are many examples of possible such steps or operational commands. Some could include, for example, a vehicle driver being notified or alerted to the situation, and to ensure that driving does not continue into a lower ambient temperature range that would cause drop in voltage. As another example, an operational command could be (including wirelessly) provided to a heating system or element that may be installed with or near the zinc-air battery to cause the temperature not to drop such as to cause drop in voltage, etc.

Further to the above, Table 1, below, provides an illustrative, hypothetical example of different sets, or combinations, of parameter values or value ranges that may constitute or set forth, in whole or in part, definitions of particular varieties or subcategories of output voltage jeopardy events, for a particular zinc-air battery. In this hypothetical example, each row defines a particular event, of Output Voltage Jeopardy Events A-D. Definitions of events, including these events, may be, for example, reflected in a MIB. As shown, for a given row, if all of the four parameters fall within the specified ranges, then the event definition is met, event data is generated or updated accordingly, Open NMS may be used in detection and generating notifications, etc. Flows or algorithms can be utilized in determining if an event is triggered. As a simple example, For Output Voltage Jeopardy Event A, such a flow could include a conditional such as:

IF % Remaining Capacity is in the range of 25.1 to 100 AND Discharge Rate in Hours=290-310 AND temperature in ° C.=0-4.99 AND Relative Humidity in %=40-60 THEN Output Voltage Jeopardy Event A is triggered.

TABLE 1

Parameter Value Range Combinations associated with Defined Events, as can be reflected in an associated MIB

| EVENT (triggered if all four parameters in the row fall within the specified ranges or match the specified value) | % of Capacity Remaining | Discharge Rate, in Hours | Temperature ° C. | Relative humidity In % |
|---|---|---|---|---|
| Output Voltage Jeopardy Event A | 25.1-100 | 290-310 | 0-4.99 | 40-60 |
| Output Voltage Jeopardy Event B | 25.1-100 | 140-160 | 0-4.99 | 35-39.9 or 60.1-80 |
| Output Voltage Jeopardy Event C | 0.1-25 | 290-310 | 5.0-10.0 | 40-60 |
| Output Voltage Jeopardy Event D | 0.1-25 | 140-160 | 5.0-10.0 | 35-39.9 or 60.1-80 |

Some embodiments of the invention are used in connection with drunk driving. In some embodiments, multimodal sensor data is used to determine if drunk driving is or may be occurring, so that action can be taken accordingly, such as alerting (of the potential driver, or remotely, such to the police or some other entity or agency), or disabling of the vehicle. A sensor for detecting alcohol by volume in a breath of the potential driver can be one parameter that is measured, but it could be used on combination with a number of others.

In some embodiments, in-car and exterior video, camera, 3d or depth camera, and audio feeds can be utilized and analyzed as part of the multimodal sensor data, including of the car interior and exterior, surroundings, and the driver himself, which may incorporated into the definition or threshold of a drunk driving related event. In some embodiments, breath alcohol level could be one factor. The driver's identity or other personal characteristics could be utilized. Light and motion sensors within the car could also be utilized. Sensor systems could be positioned and deployed optimally for these purposes. Various other operational parameters could also be sensed and utilized, such as speed, braking, steering or steering variation, temperature/overheating, etc., which might suggest or indicate erratic or improper driving that could be associated with drunk driving. Patterns could also be mined and utilized, such as may include such parameters over time, such as patterns of high speed, erratic driving, or over-frequent braking, for example. Day of the week, holiday, and time of day, or other general environmental factors, could also be utilized. In some embodiments, sensors on the person of the driver, or a device such as a mobile device of the driver, could also be utilized, including location or even physiological parameters, or position, movement, or movement patterns of driver. Location of the vehicle, as determined from GPS, could also factor in, such as if the driver was or is driving in an area where drunk driving often occurs, or near a bar, for example.

Event definitions and thresholds can be expressed in terms of various multimodal sensor data. Events can include for example, a determination that drunk driving is occurring, a determination that it is occurring with a certain degree of confidence or probability, etc.

Somewhat analogously, multimodal sensor data to include much of that described in connection with drunk driving detection could be incorporated into consumer and shopping related event detection, such as detecting particular shopping activities, or shoplifting. This could include, for example, the use of camera, 3D camera, depth camera, video, audio, light sensing at and around a particular shopping area, or even a particular shelf or item, etc., as well as in connection with particular shoppers, including identity, characteristics, appearance, activity, and surroundings.

Some embodiments of the invention relate to medical, hospital or patient monitoring, or environmental or other monitoring. In some embodiments, external as well as wearable, internal or other sensors can be utilized to sense various parameters, such as pulse rate or variability, heart rate or variability, respiratory rate or variability, pulse rate or variability, body fluid analyte content, movement, nervous system parameters, and many others. Such monitoring can include or be associated with various monitoring, such as for monitoring any of various patient parameters, organs, aspects, conditions, circumstances, or environmental or safety-related conditions or circumstances etc. These can include, for example, heart or heart-related monitoring or management devices, such as a pacemaker, smart watch, smart belt, smart shirt, camera, or various other wearable monitoring or management devices. Furthermore, according to some embodiments, monitoring devices can include, for example, devices to monitor physiological or environmental indications, evidence, signs or potential signs of particular conditions or dangerous or distress type situations. For a patient, person or animal, for example, such conditions can include, for example, stroke, heart attack, etc. Furthermore, monitoring devices can be used to monitor environmental or other conditions (whether or not associated with a person or biological entity), such as for older or infirm persons, such as might indicate a slip or fall, dangerous position or location, etc.

In some embodiments, various of the above could be used in addition to various other parameters, many of which are generally described in connection with drunk driving and consumer related application, including camera, 3D camera, depth camera, video, audio, light, patient identity, appearance and position, patient surroundings, etc. Feed from other medical monitoring systems associated with the patient could also be incorporated and utilized. Many different types of events could be determined, or determined with some degree of confidence or probability. These could include particular physiological events, such as occurrence or status indicating a cardiac event or danger status, and many others. Definitions and thresholds relating to events can be expressed in terms of various multimodal sensor data.

Furthermore, in some embodiments, any of various monitoring and other devices can be used in connection with monitoring, and detected events that may not be, or may not only be, associated with a person, such as events associated with animals, plants, weather, environmental conditions or occurrences, structures, objects, etc. For example, monitoring devices could be used to detect a weather or environmental occurrence such as a tree falling due to a storm or wind storm. In addition to monitoring in connection with the tree (or other object or environmental or structural feature, whether or not associated with a living or biological entity), various parameters could be sensed and utilized, such as, in this example, storm parameters such as wind, rain, lightning, temperature, humidity, barometric pressure, etc. Such an approach could be used in connection with various other events in connection with living and non-living entities, including environmental features, structural features, etc.

Methods according to embodiments of the invention can apply to vehicles of various types, including cars, planes, ships, trains etc., and at various levels in terms of components and component sets, and fine-grained, multimodal parameter measurements associated therewith. In each case, a MIB or portion thereof can be organized and structured to match the particular scenario, including the mapping and definitions therein.

Many different contexts may also be represented. For example, in a consumer context, multiple audio and video parameter data may be used in definitions of events such as fraud, shoplifting, or others. In such scenarios, a MIB or portion thereof could be structured and organized to reflect or model human behaviors, or behavioral events, for example. In a medical or pain management scenario, parameters associated with multiple monitored vital or other bodily system parameters, such as pulse rate, blood pressure, etc., may form part of a definition of a medical event, such as a heart attack, or an at-risk status, etc. The patient, or patient parameters, in such a scenario, could conceptually be represented by a MIB or a portion thereof. In a driving scenario, audio, video and other parameter data could be used, for example, in determining that drunk driving is occurring or may be likely to be occurring, etc. MIBs can be used in connection with many industries and devices in those industries, such as manufacturing devices and facilities. The MIB can be structured advantageously to reflect such sets of parameters and associations with context-relevant events.

In some embodiments, in various scenarios, event data can be generated or updated, and, after being detected within the network, actions may be caused, triggered or taken based at least in part on the operational or behavioral event signaled. For example, in a battery overheating scenario, signaling may be provided over the network to send instructions or commands to modify operation of the battery or its components to prevent or mitigate damage or failure, or an alert can be triggered to the driver or some other entity, etc. In a consumer, retail, banking or other scenario, triggered actions could include system or human alerting, police or official entity alerting, alarms, enhanced monitoring, automatically locking or securing of devices or premises, etc. In a driver scenario, action could include user alerting, police alerting, automatic shut-off, etc. In a patient scenario, triggered actions could include medical alerts, or even automatic administration of medical or medicinal measures, etc.

In some embodiments, full user interface dashboards can be provided, which may include alerts or status information on various detected events and may allow action to be taken in response.

In some embodiments, logs can be created over time of parameter monitoring and measurements, such as using blockchains. Such logs can then be used in many ways, such as, for example, as training data to machine learning models, to optimize event database structure and mapping to events, etc.

Consider a use case where the disclosed techniques are leveraged to monitor behaviors of shoppers within a supermarket. Behaviors in a supermarket can be defined according to location-specific or context-specific ontology. For example, the behaviors could be defined as having a hierarchy where the root of the hierarchy represents the context-specific setting, the supermarket in this case. A second level in the hierarchy could include nodes representing activities associated with shopping or working to cover behaviors associated with consumers and employees respectively. Each of these nodes can be further broken down into finer levels of detail to cover more specific behaviors; browsing, inspecting a product, purchasing, checking out, or other activities of a shopper for example. Such an ontology can be considered a domain ontology associated with the supermarket and can be implemented in a machine readable format, possibly based on the OWL standard format. One should appreciate that the disclosed inventive subject matter is considered to include software based tools that enable users to create domain ontologies or otherwise manage domain ontologies for use with identifying behaviors.

Continuing with the example, an analysis engine can ingest a supermarket domain ontology OWL file to instantiate a memory model of context-specific behaviors according to the encoded ontology. The analysis engine can further assign nodes and/or edges in the ontology with object identifiers associated with a corresponding MIB, thus enabling use of SNMP in this use case. More specifically, the object identifiers can be organized according to a hierarchical tree structure as desired to facilitate the mapping to the behavior domain ontology and to facilitate addressing each behavior individually using software tools (e.g., OpenNSM).

Further each behavior within the domain ontology can be assigned criteria defining when the behavior is considered to have (or will) occur as a function of the observed sensor data. The criteria can be defined according to the attributes, attribute-value pairs for example, associated with sensor data where the attributes can be derived based on the raw sensor data or derived from the raw sensor data. Continuing with the example of the supermarket, the sensors could include security cameras, cell phone sensors (e.g., camera, location, microphone, etc.), temperature sensors, or other types of sensors. As the security cameras capture digital representations of people in the supermarket, a recognition engine can apply one or more image processing techniques (e.g., SIFT, SURF, DAISY, etc.) to recognize people as employees (i.e., recognized person) or shoppers (i.e., unrecognized person). Further, cell phone running a location-based app or employee name tags with RFID can be used to determine locations of persons within the supermarket. Such sensor information gives rise to a tuple of attributes, possibly in the form of attribute-value pairs. When the tuple satisfies the criteria of a behavior in the ontology, the MIB for the behavior can be updated, possibly triggering an SNPM message to another computer system. This approach is considered advantageous because it leverages existing networking software tools (e.g., SNMP, OpenNMS, etc.) to map a sensed environment to behavior and generate notifications using trusted techniques.

Yet another aspect of the shopping example includes using the behavior identification as outlined above to planogram management. In view that products are placed on fixtures according to planograms, interactions or other behaviors associated with the products can be used as evidence for the effective of such planograms. For example, if a recognized person is a shopper, the shopper's behaviors such as browsing, price checking, or purchasing can be mapped directly the planograms indicating, possibly as a heat map, the efficiency of the planogram or suggesting changes to the planogram. Further, if the recognized person is an employee, the employee's behaviors such as restocking, cleaning, or altering product placement can be used to indicate that the supermarket is properly leveraging a brand's planogram. Example techniques associated with virtual planograms that could be adapted for use with the disclosed techniques can be found in co-owned U.S. Pat. No. 9,430,752 to Soon-Shiong titled "Virtual Planogram Management, Systems, and Methods" filed Nov. 2, 2012. Although the previous example focused on the domain of shopping in a supermarket, it should be appreciated that the fundamental foundations (e.g., domain behavior ontology, MIB mapping, sensor to behavior, etc.) can be applied to other markets as well including sports, healthcare management, hospitals, eSports, military, construction, physical therapy, janitorial services, educational services, or other markets.

In a more traditional networking setting, the disclosed inventive subject matter can be leveraged to offer fine grained management of behaviors in a home automation IoT ecosystem. Just as in the supermarket case, an ensemble of IoT devices can be treated as sensors whose information combine to outline possible behaviors of the ecosystem. For example, a home can be instrumented with controllers and/or sensors for fans, lights, doorbells, pressure plates (e.g., occupancy sensor), infra read sensors, $CO_2$ sensors, electrical plugs, TVs, thermostats, cameras, appliances, or other devices. As the devices sense their environment, the sensor data can be analyzed to construct behaviors by a device manager (e.g., a set top box, Amazon® Echo®, home computer, etc.) and then mapped to behaviors of the environment itself or of individuals within the environment. Detected behaviors can trigger actions within the ecosystem; possibly generate an alarm when an illegal behavior has be identified based on observing a window seal breaking and an unrecognized person entering the home.

An astute reader will appreciate that due to the indirect mapping of observed sensor data to behaviors via ontologies one can also use the sensor data to map to more esoteric, yet useful concepts. Consider a data structure that represents a unit of electrical energy, say a Kilowatt-hour. The data structure can be used to track the unit of energy from creation to use. For example, the data structure can be instantiated when the unit of energy is created at the site of a solar cell on the roof of a house. Further the unit of energy can be stored in a battery. While stored, the data structure can include information relating to the physical nature of the battery (e.g., location, capacity, timestamp of storage, etc.). The data structure can be further updated if the unit of energy is transferred to a different storage facility, battery, or other location. Yet further the data structure can be updated when the unit of energy is actually consumed. It is appreciated that this description represents a virtual management of a unit of energy. However, the data structure provides a way to track energy, similar to carbon credits, from creation to consumption. Further, with respect to the inventive subject matter, as the unit of energy flows through an energy management ecosystem as tracked by the data structure, the unit of energy can be considered to interact with the various aspects of the ecosystem. Such interactions can be considered behaviors that, again, can be mapped to an otology and managed as disclosed.

Not all embodiments will have concise or concrete definitions of a behavior with respect sensor data. In such scenarios, machine learning techniques can be leveraged to map to the behaviors. As sensor data is collected and correlated with behaviors, a training data set can be compiled that represents the sensor data (i.e., the collection of attribute-value pairs, tuples, etc.) as categorized or classified as a behavior. If the sensor data falls within well-defined input signals, techniques such as support vector machines can be used to classify the behaviors. If the sensor data is less well-defined with respect to the input signals, neural networks can be used to classify the behaviors. Suitable machine learning software packages include scikit-learn (see URL www.scikit-learn.org) or TensorFlow (see URL www.tensorflow.com).

Some embodiments of the present invention use or adapt techniques described in U.S. Application, publication number US20160117596A1 (hereinafter, "US20160117596A1"), entitled "Reasoning Engines", which is hereby incorporated herein by reference in its entirety. For example, techniques associated with correlations between aspects of an environment, as well as in object recognition, can be used in event database mapping structures and definitions in embodiments of the invention. Still further, in some embodiments, such techniques, and reasoning engine output, can be used as training data to update machine learning models and event databases. Furthermore, aspects of reasoning engines can be included in network management engines of embodiments of the invention.

Furthermore, types of sensors and interfaces as described in US20160117596A1 can be advantageously used in embodiments of the invention and can form aspects of multimodal sensor data. For example, characteristics or parameters that can be observed from sensors can include physical characteristics (e.g., size, shape, dimension, mass, weight, material, etc.), electrical characteristics (e.g., resistance, current, voltage, capacitance, reactance, inductance, permeability, permittivity, etc.), mechanical characteristics (e.g., stress, strain, torque, torsion, force, tension, compression, density, hardness, shear, friction, etc.), acoustical characteristics (e.g., spectrum, frequency, wavelength, absorption, amplitude, phase, etc.), chemical characteristics (e.g., reactivity, pH, surface tension, surface energy, etc.), optical characteristics (e.g., absorptivity, color, luminosity, photosensitivity, reflectivity, refractive index, transmittance, spectrum, spectrum, frequency, wavelength, absorption, amplitude, phase, polarization, etc.), or other types of properties. Such properties can be obtained directly from sensors directly or indirectly, and reflect changes in aspects of environment, a patient's body or a building, for example. Sensors and other items within a network or ecosystem can communicate among each other or remotely as desired. Elements within an ecosystem may communicate over one or more wireless protocols, depending on the nature of the element. For example, high bandwidth protocols may possibly include Ultra-Wide Band (UWB), Wi-Fi, WiGIG, cellular networks (e.g., CDMA, GSM, etc.), or other types of broadband communications. Smaller elements can potentially use lower bandwidth protocols including Zigbee, wireless USB, Bluetooth, near field communications, or other protocols. The protocols used for exchanging data among elements of ecosystem or remotely can be configured to fit the bandwidth needs of the communication channel.

Some embodiments of the invention use or adapt techniques described in U.S. Pat. No. 8,504,740, entitled, "MILARRS Systems and Methods", which is hereby incorporated herein by reference in its entirety. For example, interfaces and configurations of interfaces as described therein can be used advantageously in embodiments of the present invention, for example, in elements of instrumenting of devices, or in causing modification of operation in response to event data detection, for instance. For example, in some embodiments of the current invention, any of currently known serial interfaces are contemplated, as well as those that are developed in the future. Currently completed standards for such interfaces include, for example, I2C, SPI, CAN, Profibus, RS 232, RS 485, RS 422, USB, Ethernet, or even Gigabit Ethernet. Certainly, where a given module has multiple serial interfaces, those interfaces can be of different types (i.e., operate using different standards). Depending on the application, a contemplated serial interface could be built based on a set of general purpose programmable I/O (GPIO) pins. Such pins can be driven by software running on a remote management module's (RMM's) CPU or the device's CPU implying the GPIO pins also provide a serial I/O interface. Connection from serial port 11 to the RMM 20 can be accomplished in any desired manner, including hardwiring through phone lines, cables, connectors, soldering, or over the Internet. Typical management environment interfaces 27 are Ethernet, 802.11a/b/g, ATM, or others. These interfaces are used to send data over packet switched networks including LANs, WANs, WLANs, or Internet.

Some embodiments of the invention use or adapt techniques described in U.S. Pat. No. 9,547,678, entitled, "Activity Recognition Systems and Methods", which is hereby incorporated herein by reference in its entirety. For example, techniques relating to database configuration as well as recognition determination modelling, such as using graphing and scoring, can be used in embodiments of the present invention, such as in structuring of event databases, as well as in determining potentially complex or functionally specified definitions of events.

Some embodiments of the invention use or adapt techniques described in U.S. Pat. No. 8,683,591, entitled, "Vector-Based Anomaly Detection", which is hereby incorporated herein by reference in its entirety, which includes techniques for detecting anomalous behaviors associated with multimode networks. The patent describes, among other things, techniques in which vector-represented baselines are utilized and are a function of several behavior metrics. Anomalies are then determined based on variation from the baseline. An analogy can be drawn in some ways with some embodiments of the present invention, in which events (which can include occurrence or continued occurrence of states, conditions or statuses) are determined based on multiple sensed parameters, potentially in complex or function-specified ways. As such, vector-based techniques as described in U.S. Pat. No. 8,683,591, which may take into account multiple parameters and may effectively define anomalies via variation from a vector-based baseline, can be adapted for use in vector-based, multimodal sensor data definitions of operational or behavioral events, whether or not anomalies.

Some embodiments of the present invention use or adapt techniques described in U.S. Application, publication number US20150262036A1 (hereinafter, "US20150262036A1"), entitled "Global Visual Vocabulary, Systems and Methods", which is hereby incorporated herein by reference in its entirety. US20150262036A1 includes description of techniques in which a hierarchically structured and indexed global vocabulary and descriptor space, which can be used in populated a database, and can provide information on recognized images or objects. In some embodiments of the present invention, elements of structuring and organization described in US20150262036A1 can be adapted and used in structuring and organization of event databases, such as MIBs, that contain hierarchical or ontologically structured representations of operational or behavioral events.

Figure 9:
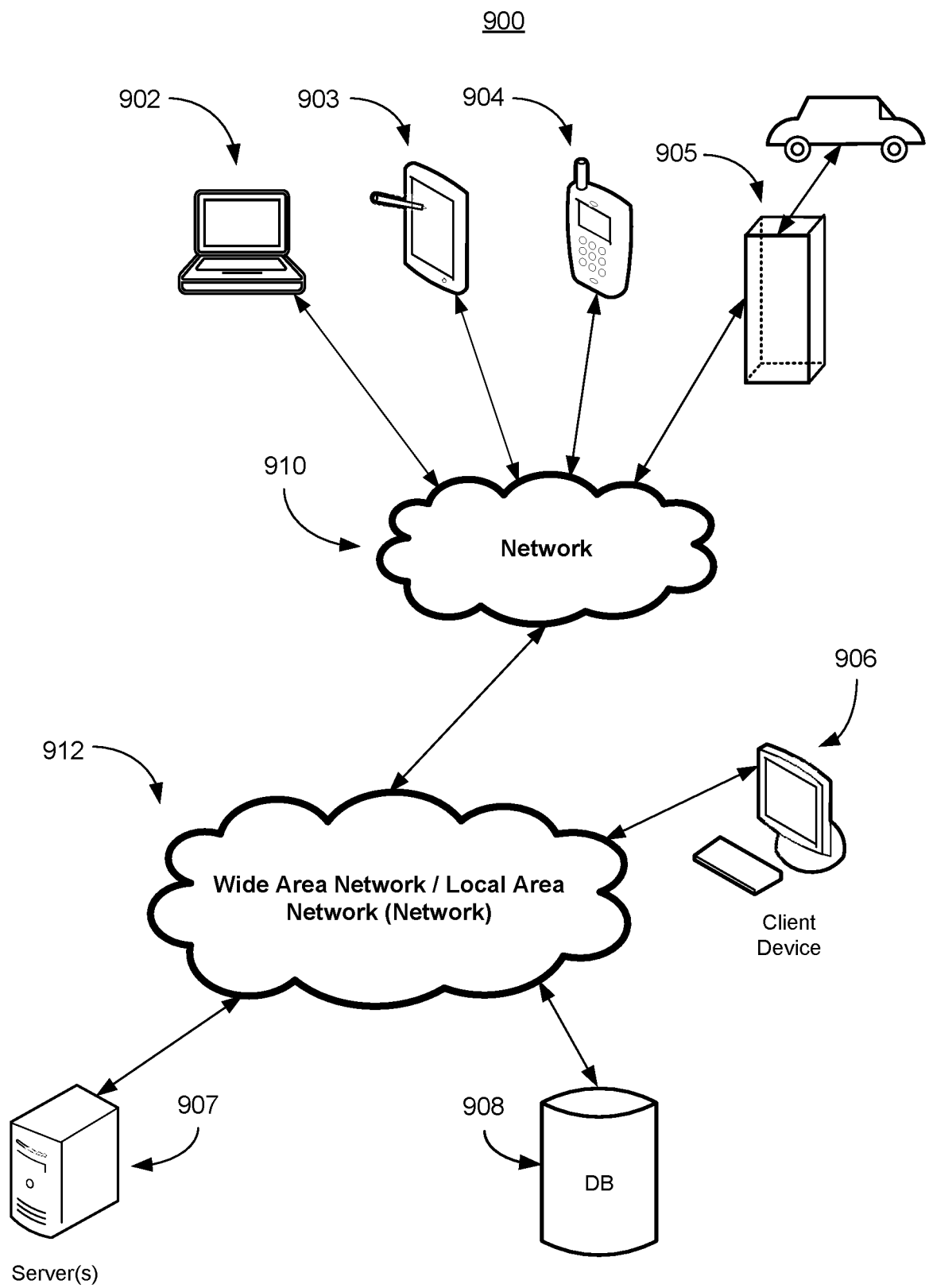
FIG. 9 illustrates a block diagram of a distributed computer system that can implement one or more aspects of a network management system or method according to an embodiment of the invention.

FIG. 9 illustrates components of one embodiment of an environment in which the invention may be practiced. Not all of the components may be required to practice the invention, and variations in the arrangement and type of the components may be made without departing from the spirit or scope of the invention. As shown, the system 900 includes a network 910, which may broadly include one or more networks, such as cloud networks, wired or wireless networks, local area networks ("LANs")/wide area networks ("WANs"). The system 900 further includes one or more wired or wireless devices 902-906, such as may include or be coupled with one or more servers 907, such as may include, or include elements of, for example, network management engine 902, and one or more data stores or databases 808, such as Event database 904. Various of the client devices 902-906 may include a wide array of types of devices, which may or may not be incorporated or associated with large or other devices, including, for example, desktop computers, laptop computers, set top boxes, tablets, cell phones, smart phones, batteries, vehicle batteries, power management devices, network management devices, monitoring devices, medical or health care related devices, video or audio devices, tracking devices, and many others. Each of the devices 902-906 may include various elements or components including wired or wireless interfaces, software or hardware instrumentation, etc.

Figure 10:
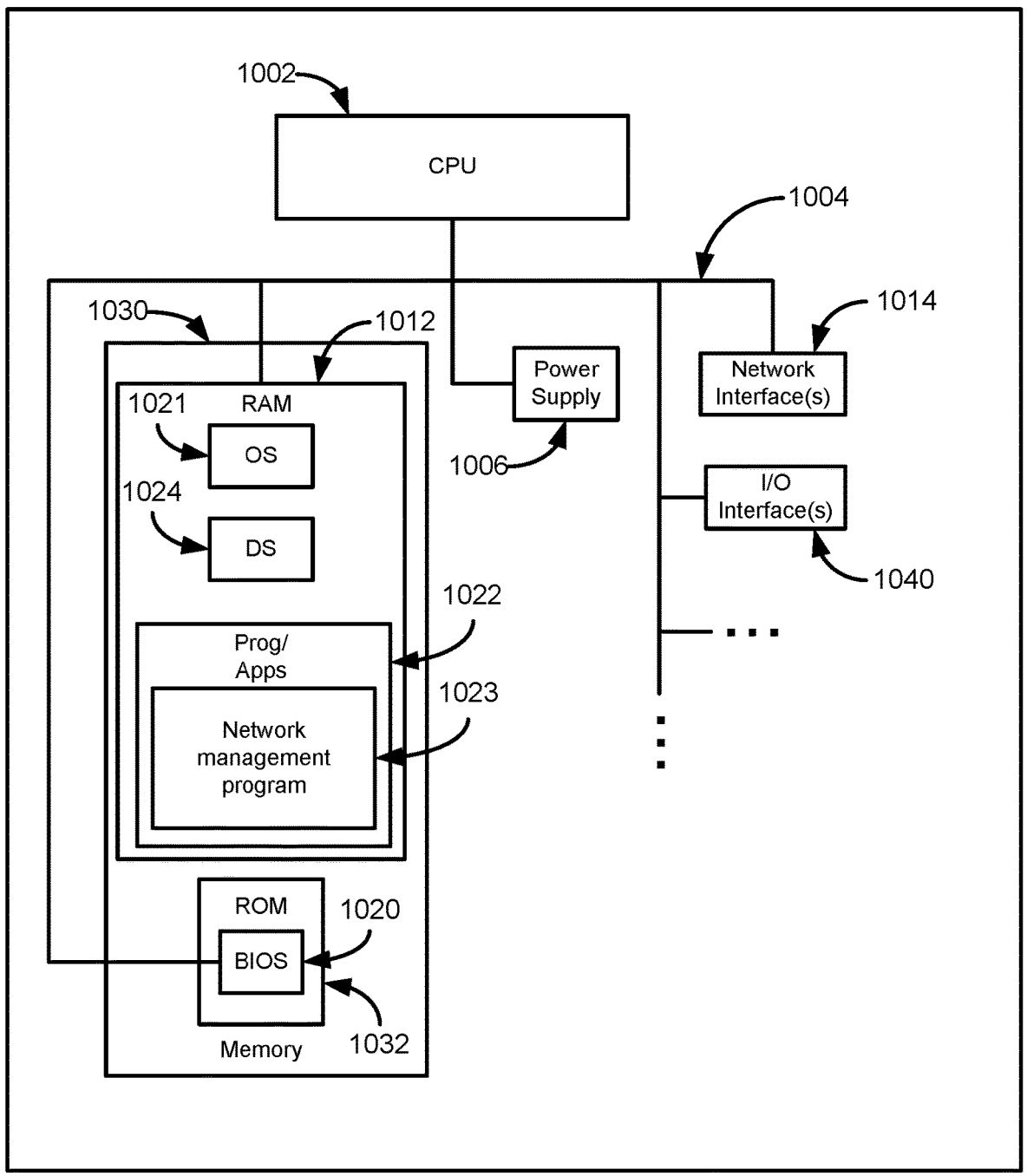
FIG. 10 illustrates a block diagram of an electronic device that can implement one or more aspects of a network management system or method according to one embodiment of the invention.

FIG. 10 illustrates a block diagram of an electronic device 1000 that can implement one or more aspects of a network management system or method according to one embodiment of the invention. Instances of the electronic device 1000 may include servers, e.g. servers 907-908, and devices, e.g. devices 902-906. In general, the electronic device 1000 can include a processor 1002, memory 1030, a power supply 1006, and input/output (I/O) components 1040, e.g., microphones, speakers, displays, touchscreens, keyboards, keypads, GPS components, etc., which may be operable, for example, to provide graphical user interfaces. The electronic device 1000 can also include a communications bus 1004 that connects the aforementioned elements of the electronic device 1000. Network interfaces 1014 can include a receiver and a transmitter (or transceiver), and an antenna for wireless communications.

The processor 1002 can include one or more of any type of processing device, e.g., a central processing unit (CPU). Also, for example, the processor can be central processing logic. Central processing logic, or other logic, may include hardware, firmware, software, or combinations thereof, to perform one or more functions or actions, or to cause one or more functions or actions from one or more other components. Also, based on a desired application or need, central processing logic, or other logic, may include, for example, a software controlled microprocessor, discrete logic, e.g., an application specific integrated circuit (ASIC), a programmable/programmed logic device, memory device containing instructions, etc., or combinatorial logic embodied in hardware. Furthermore, logic may also be fully embodied as software.

The memory 1030, which can include RAM 1012 and ROM 1032, can be enabled by one or more of any type of memory device, e.g., a primary (directly accessible by the CPU) or secondary (indirectly accessible by the CPU) storage device (e.g., flash memory, magnetic disk, optical disk). The RAM can include an operating system 1021, data storage 1024, which may include one or more databases, and programs and/or applications 1022, which can include, for example, software aspects of the network management program 103. The ROM 1032 can also include BIOS 1020 of the electronic device.

The Network Management Program 1023 is intended to broadly include or represent all programming, applications, algorithms, software and other tools necessary to implement or facilitate methods and systems according to embodiments of the invention, which may include elements of a network management engine, such as network management engine 102. The elements of the Network Management Program 1023, or of a network management engine, may exist on a single server computer or be distributed among multiple computers, devices or entities.

The power supply 1006 contains one or more power components and facilitates supply and management of power to the electronic device 1000.

The input/output components, including I/O interfaces 1040, can include, for example, any interfaces for facilitating communication between any components of the electronic device 1000, components of external devices (e.g., components of other devices of the network or system 900), and end users. For example, such components can include a network card that may be an integration of a receiver, a transmitter, and one or more input/output interfaces. A network care, for example, can facilitate wired or wireless communication with other devices of a network. In cases of wireless communication, an antenna can facilitate such communication. Also, some of the input/output interfaces 1040 and the bus 1004 can facilitate communication between components of the electronic device 1000, and in an example can ease processing performed by the processor 1002. In some embodiments, the device 1000 may include or be coupled to network management device instrumentation, such as network management related device instrumentation 110.

Where the electronic device 1000 is a server, it can include a computing device that can be capable of sending or receiving signals, e.g., via a wired or wireless network, or may be capable of processing or storing signals, e.g., in memory as physical memory states. The server may be an application server that includes a configuration to provide one or more applications via a network to another device. Also, an application server may, for example, host a Web site that can provide a user interface for administration of example aspects of the Network Management Program 1023.

Any device capable of sending, receiving, and processing data over a wired and/or a wireless network may act as a server, such as in facilitating aspects of implementations of the Network Management Program 1023. Thus, devices acting as a server may include devices such as dedicated rack-mounted servers, desktop computers, laptop computers, set top boxes, integrated devices combining one or more of the preceding devices, other devices, etc.

Servers may vary in widely in configuration and capabilities, but they generally include one or more central processing units, memory, mass data storage, a power supply, wired or wireless network interfaces, input/output interfaces, and an operating system such as Windows Server, Mac OS X, Unix, Linux, FreeBSD, etc.

A server may include, for example, a device that is configured, or includes a configuration, to provide data or content via one or more networks to another device, such as in facilitating aspects of an example Network Management Program 1023. One or more servers may, for example, be used in hosting a Web site.

Servers may also, for example, provide a variety of services, such as Web services, third-party services, audio services, video services, email services, instant messaging (IM) services, SMS services, MMS services, FTP services, voice or IP (VOIP) services, calendaring services, phone services, advertising services etc., all of which may work in conjunction with example aspects of an example Network Management Program 923. Content may include, for example, text, images, audio, video, advertisements, etc.

In example aspects of the Network Management Program 1023, devices may include, for example, any device capable of sending and receiving data over a wired and/or a wireless network. Such devices may include desktop computers as well as portable devices such as cellular telephones, smart phones, display pagers, radio frequency (RF) devices, infrared (IR) devices, handheld computers, tablets, GPS-enabled devices tablet computers, sensor-equipped devices, laptop computers, set top boxes, monitoring devices, medically related devices, consumer related devices, tracking devices, battery or power management devices, and many others. Devices may range widely in terms of capabilities and features. For example, a cell phone, smart phone or tablet may have a numeric keypad and a few lines of monochrome LCD display on which only text may be displayed. In another example, a Web-enabled client device may have a physical or virtual keyboard, data storage (such as flash memory or SD cards), accelerometers, gyroscopes, GPS or other location-aware capability, and a 2D or 3D touch-sensitive color screen on which both text and graphics may be displayed.

Devices, such as client devices 902-906, for example, may run a variety of operating systems, including personal computer operating systems such as Windows, iOS or Linux, and mobile operating systems such as iOS, Android, and Windows Mobile, etc. Client devices may be used to run one or more applications that are configured to send or receive data from another computing device. Client applications may provide and receive textual content, multimedia information, etc. Client applications may perform actions such as browsing webpages, using a web search engine, sending and receiving messages via email, SMS, or MMS, playing games (such as fantasy sports leagues), receiving advertising, watching locally stored or streamed video, or participating in social networks.

In example aspects of the Network Management Program 1023, one or more networks, such as networks 1010 or 1012, for example, may couple, such as via interfaces or instrumentation, servers and devices with other computing devices, including through wireless network to client devices. A network may be enabled to employ any form of computer readable media for communicating information from one electronic device to another. A network may include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling data to be sent from one to another.

Communication links within LANs may include twisted wire pair or coaxial cable, while communication links between networks may utilize analog telephone lines, cable lines, optical lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and a telephone link.

A wireless network, such as wireless network 1010, as in an example Network Management Program 1023, may couple devices with a network. A wireless network may employ stand-alone ad-hoc networks, mesh networks, Wireless LAN (WLAN) networks, cellular networks, etc.

A wireless network may further include an autonomous system of terminals, gateways, routers, or the like connected by wireless radio links, or the like. These connectors may be configured to move freely and randomly and organize themselves arbitrarily, such that the topology of wireless network may change rapidly. A wireless network may further employ a plurality of access technologies including 2nd (2G), 3rd (3G), 4th (4G) generation, Long Term Evolution (LTE) radio access for cellular systems, WLAN, Wireless Router (WR) mesh, etc. Access technologies such as 2G, 2.5G, 3G, 4G, 5G and future access networks may enable wide area coverage for client devices, such as client devices with various degrees of mobility. For example, wireless network may enable a radio connection through a radio network access technology such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, etc. A wireless network may include virtually any wireless communication mechanism by which information may travel between client devices and another computing device, network, etc.

Internet Protocol may be used for transmitting data communication packets over a network of participating digital communication networks, and may include protocols such as TCP/IP, UDP, DECnet, NetBEUI, IPX, Appletalk, and the like. Versions of the Internet Protocol include IPv4 and IPv6. The Internet includes local area networks (LANs), wide area networks (WANs), wireless networks, and long haul public networks that may allow packets to be communicated between the local area networks. The packets may be transmitted between nodes in the network to sites each of which has a unique local network address. A data communication packet may be sent through the Internet from a user site via an access node connected to the Internet. The packet may be forwarded through the network nodes to any target site connected to the network provided that the site address of the target site is included in a header of the packet. Each packet communicated over the Internet may be routed via a path determined by gateways and servers that switch the packet according to the target address and the availability of a network path to connect to the target site.

A "content delivery network" or "content distribution network" (CDN), as may be used in an example Network Management Program 1023, generally refers to a distributed computer system that comprises a collection of autonomous computers linked by a network or networks, together with the software, systems, protocols and techniques designed to facilitate various services, such as the storage, caching, or transmission of content, streaming media and applications on behalf of content providers. Such services may make use of ancillary technologies including, but not limited to, "cloud computing," distributed storage, DNS request handling, provisioning, data monitoring and reporting, content targeting, personalization, and business intelligence. A CDN may also enable an entity to operate and/or manage a third party's Web site infrastructure, in whole or in part, on the third party's behalf.

A peer-to-peer (or P2P) computer network relies primarily on the computing power and bandwidth of the participants in the network rather than concentrating it in a given set of dedicated servers. P2P networks are typically used for connecting nodes via largely ad hoc connections. A pure peer-to-peer network does not have a notion of clients or servers, but only equal peer nodes that simultaneously function as both "clients" and "servers" to the other nodes on the network.

The various embodiments are described with reference to the accompanying drawings, which form a part hereof, and which show, by way of illustration, specific examples of practicing the embodiments. This specification may, however, be embodied in many different forms and should not be construed as limited to the embodiments set forth herein; rather, these embodiments are provided so that this specification will be thorough and complete, and will fully convey the scope of the invention to those skilled in the art. Among other things, this specification may be embodied as methods or devices. Accordingly, any of the various embodiments herein may take the form of an entirely hardware embodiment, an entirely software embodiment or an embodiment combining software and hardware aspects. The following specification is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" includes plural references. The meaning of "in" includes "in" and "on."

It is noted that description is not intended as an extensive overview, and as such, concepts may be simplified in the interests of clarity and brevity.

The specification is to be understood as being in every respect illustrative and exemplary, but not restrictive, and the scope of the invention disclosed herein is not to be determined from the specification, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A networked energy management system comprising:
   a first non-transitory computer readable memory configurable to store an energy unit data structure representing a unit of energy;
   a second non-transitory computer readable memory storing a management information base (MIB), wherein the MIB maps multimodal sensor data to energy events relating to the unit of energy and wherein the MIB is represented by a hierarchical ontology vocabulary; and
   one or more processors coupled with the first and second non-transitory computer readable memories and configured to execute software instructions that cause the one or more processors to:
     obtain a set of multimodal sensor data comprising a plurality of different types of sensor data and that relates to the unit of energy;
     map the set of multimodal sensor data to one or more energy events based on the MIB and based on a combination of values of the plurality of different types of sensor data, wherein the combination of values of the plurality of different types of sensor data includes a combination of values of a percentage of capacity remaining and a discharge rate;
     update the energy unit data structure in the first non-transitory computer readable memory according to the one or more energy events; and
     update energy event data associated with the energy unit data structure via network management software.

2. The system of claim 1, wherein the one or more energy events comprise an operational energy event.

3. The system of claim 1, wherein the one or more energy events comprise a behavior energy event.

4. The system of claim 1, wherein the one or more energy events comprise at least one of the following events: creation of a unit of energy, storage of the unit of energy, transfer of the unit of energy, and consumption of the unit of energy.

5. The system of claim 1, wherein the update of the energy unit data structure includes at least one of the following: instantiation of the energy unit data structure in the first memory, storage of the energy unit data structure, including location information in the energy unit data structure, including capacity information in the energy unit data structure, and including timestamp information in the energy unit data structure.

6. The system of claim 1, wherein the hierarchical ontology vocabulary represents a domain ontology.

7. The system of claim 6, wherein the domain ontology represents an energy domain.

8. The system of claim 7, wherein the domain ontology comprises at least one node that represents a context-specific setting.

9. The system of claim 1, wherein the energy event data represents when an energy event is expected to occur.

10. The system of claim 1, wherein the energy event data represents a heat map.

11. The system of claim 1, wherein the set of multimodal sensor data comprises sensor data obtained from one or more networked devices coupled with the one or more processors.

12. The system of claim 11, wherein the set of multimodal sensor data comprises at least one of the following types of data from the one or more networked devices: image data, video data, location data, temperature data, RFID data, physical characteristic data, electrical characteristic data, mechanical characteristic data, acoustical characteristic data, chemical characteristic data, optical characteristic data, and battery data.

13. The system of claim 11, wherein the network devices include at least one of the following: an edge device, a battery, a manufacturing device, a power management device, and a medical device.

14. The system of claim 13, wherein the battery comprises as least one of the following types of batteries: a vehicular battery, a lithium ion battery, a zinc-air battery.

15. The system of claim 13, wherein the set of multimodal sensor data includes at least one of the following battery related sensed data: an operating temperature, a temperature gradient, a temperature difference, a voltage, a nominal voltage, a current, a charge, a discharge, a transient response, an internal resistance, a cathode area, an air availability, an air distribution, an oxygen level, a porosity, a catalytic value, a capacity, a power, and an age.

16. The system of claim 1, wherein the execution of the software instructions further causes the one or more processors to trigger an action based on the energy event data and upon detection of the one or more energy events.

17. The system of claim 16, wherein the action comprises at least one of the following: sending commands to a battery over a network, sending an alert, locking a device, and generating an alarm.

18. The system of claim 1, wherein the network management software comprises at least one of the following: OpenNMS network monitoring software, and a simple network management protocol (SNMP) tool.

19. The system of claim 1, wherein the execution of the software instructions further causes the one or more processors to store the energy event data on a ledger data structure.

20. The system of claim 19, wherein the ledger data structure comprises a distributed ledger.

21. The system of claim 19, wherein the ledger data structure comprises a blockchain.

22. The system of claim 1, wherein the combination of values of the plurality of different types of sensor data includes a combination of values of an operating temperature and a relative humidity.

23. The system of claim 1, wherein the energy event data is derived from the set of multimodal sensor data.

24. The system of claim 1, wherein the unit of energy interacts with an energy management ecosystem, and wherein interactions of the unit of energy with the energy management ecosystem are managed by the networked energy management system.

25. A networked energy management method, comprising:
- storing, by a first non-transitory computer readable memory, an energy unit data structure representing a unit of energy;
- storing, by a second non-transitory computer readable memory, a management information base (MIB), wherein the MIB maps multimodal sensor data to energy events relating to the unit of energy and wherein the MIB is represented by a hierarchical ontology vocabulary;
- obtaining a set of multimodal sensor data comprising a plurality of different types of sensor data and that relates to the unit of energy;
- mapping the set of multimodal sensor data to one or more energy events based on the MIB and based on a combination of values of the plurality of different types of sensor data, wherein the combination of values of the plurality of different types of sensor data includes a combination of values of a percentage of capacity remaining and a discharge rate;
- updating the energy unit data structure in the first non-transitory computer readable memory according to the one or more energy events; and
- updating energy event data associated with the energy unit data structure via network management software.

26. A non-transitory computer readable medium or media containing instructions for executing a networked energy management method comprising:
- storing, by a first non-transitory computer readable memory, an energy unit data structure representing a unit of energy;
- storing, by a second non-transitory computer readable memory, a management information base (MIB), wherein the MIB maps multimodal sensor data to energy events relating to the unit of energy and wherein the MIB is represented by a hierarchical ontology vocabulary;
- obtaining a set of multimodal sensor data comprising a plurality of different types of sensor data and that relates to the unit of energy;
- mapping the set of multimodal sensor data to one or more energy events based on the MIB and based on a combination of values of the plurality of different types of sensor data, wherein the combination of values of the plurality of different types of sensor data includes a combination of values of a percentage of capacity remaining and a discharge rate;
- updating the energy unit data structure in the first non-transitory computer readable memory according to the one or more energy events; and
- updating energy event data associated with the energy unit data structure via network management software.

* * * * *